United States Patent [19]

Nakamura et al.

[11] Patent Number: 5,069,983
[45] Date of Patent: Dec. 3, 1991

[54] MAGNETIC RECORDING MEMBER

[75] Inventors: Kyuzo Nakamura; Yoshifumi Ota; Michio Ishikawa; Noriaki Tani; Masanori Hashimoto; Yuzo Murata, all of Yachimata, Japan

[73] Assignee: Nihon Shinku Gijutsu Kabushiki Kaisha, Chigasaki, Japan

[21] Appl. No.: 414,235

[22] Filed: Sep. 29, 1989

[30] Foreign Application Priority Data

Dec. 6, 1988 [JP] Japan .................................. 63-307003
May 12, 1989 [JP] Japan .................................. 1-117191
Jul. 25, 1989 [JP] Japan .................................. 1-190648

[51] Int. Cl.⁵ ........................................... G11B 23/00
[52] U.S. Cl. ..................................... 428/694; 428/611; 428/666; 428/667; 428/900; 428/928
[58] Field of Search ............... 428/694, 900, 928, 611, 428/666, 667, 663; 427/131; 204/192.2

[56] References Cited

U.S. PATENT DOCUMENTS

| | | |
|---|---|---|
| 3,150,939 | 9/1964 | Wenner ................................ 428/612 |
| 4,245,008 | 1/1981 | Michaelson et al. ............... 428/928 |
| 4,792,497 | 12/1988 | Suzuki et al. ....................... 428/611 |
| 4,842,917 | 6/1989 | Ohno et al. ....................... 204/192.2 |
| 4,883,711 | 11/1989 | Shiroishi et al. ..................... 428/611 |
| 4,950,548 | 8/1990 | Furusawa et al. ................... 428/611 |

Primary Examiner—Paul J. Thibodeau
Attorney, Agent, or Firm—Armstrong, Nikaido, Marmelstein, Kubovcik & Murray

[57] ABSTRACT

A magnetic recording member having high coercive force, comprising:
(a) a non-magnetic substrate;
(b) a Cr base film formed on said substrate by a film forming process; and
(c) a Co alloy film formed on said Cr base film by the same film forming process as in (b),
wherein said Cr base film contains in addition to Cr at least one additional element selected from the group consisting of rare earth elements, Si, Cu, P and Ge, and wherein said Co alloy film is formed by continuous operation of said film forming process without interruption after completion of the formation of said Cr base film.

1 Claim, 3 Drawing Sheets

5,069,983

MAGNETIC RECORDING MEMBER

BACKGROUND OF THE INVENTION

This invention relates to a magnetic recording member having a high coercive force.

A known magnetic recording member having a high coercive force in the inner planar direction is widely used as a hard disc medium on which high-density recording is possible This known magnetic recording member is manufactured by first forming a Cr film on a non-magnetic substrate made of, for example, aluminum, and them forming on the Cr film a Co alloy film, by a vacuum deposition or sputtering method.

The coercive force in this prior art magnetic recording member is generated by the following mechanism. When a Cr film is formed on a non-magnetic substrate by vacuum deposition or sputtering, the obtained Cr film contains columnar crystal grains in which the (110) plane of the bcc (body-centered cubic) structure of Cr is oriented in parallel to the surface of the substrate. When a Co alloy film is then formed by continuous operation of the film formation apparatus on the Cr film, that is, without interruption of the operation of the vacuum deposition or sputtering apparatus after completion of the formation of the Cr film, the bond length in the C axis of the hcp (hexagonal close packed) structure of the Co alloy film is substantially equal to the bond length in the (110) plane of the Cr film, so that the Co alloy film epitaxially grows in such a manner that the C axis may be in parallel with the surface of the substrate. Since the C axis of the hcp structure of this Co alloy film is an easy-to-magnetize axis, the Co alloy film constitutes an in-plane magnetizing film. The Cr film forming the base layer shows a relatively distinct structure of columnar grains and, therefore, the Co alloy film grown on the Cr film also has a granular structure in which grains are isolated from one another. As explained above, this two-layer film has a single-domain, granular structure having a crystalline magnetic anisotropy in the plane, with the result that a high coercive force is thus generated.

When there is no Cr film forming the base layer or when no epitaxial growth is possible on the Cr film due to contamination of the surface of the Cr film, the crystal grains in the Co alloy film are oriented vertically, resulting in a film known as a vertically magnetizing film.

As indicated in the foregoing, in a magnetic recording member of such an in-plane recording type, the Cr film forming the base layer serves to control the crystallization orientation and the granular shape formation of the Co alloy film, thus playing an extremely important role with respect to generation of the high coercive force.

Known Co alloy films such as the one described in the foregoing include those made of Co-Ni, Co-Ni-Cr, Co-Ni-Pt, Co-Cr, Co-Cr-Pt, Co-Ni-Zr, Co-Ni-W, Co-Cr-Ta, etc.

SUMMARY OF THE INVENTION

An object of the invention is to provide a magnetic recording member having a further enhanced coercive force, in order to make possible a further increase in recording density. This object is achieved in a magnetic recording member which comprises a Cr base film formed on a non-magnetic substrate, and a Co alloy film formed on the Cr base film, wherein the Co alloy film is formed by continuous operation after the completion of the formation of the Cr base film, without interruption of the operation of the apparatus used for forming the Cr base film and the Co alloy film, and wherein the Cr base film contains at least one additional element selected from the group consisting of rare earth elements, Si, Cu, P and Ge.

DESCRIPTION OF THE INVENTION

Figure 1:
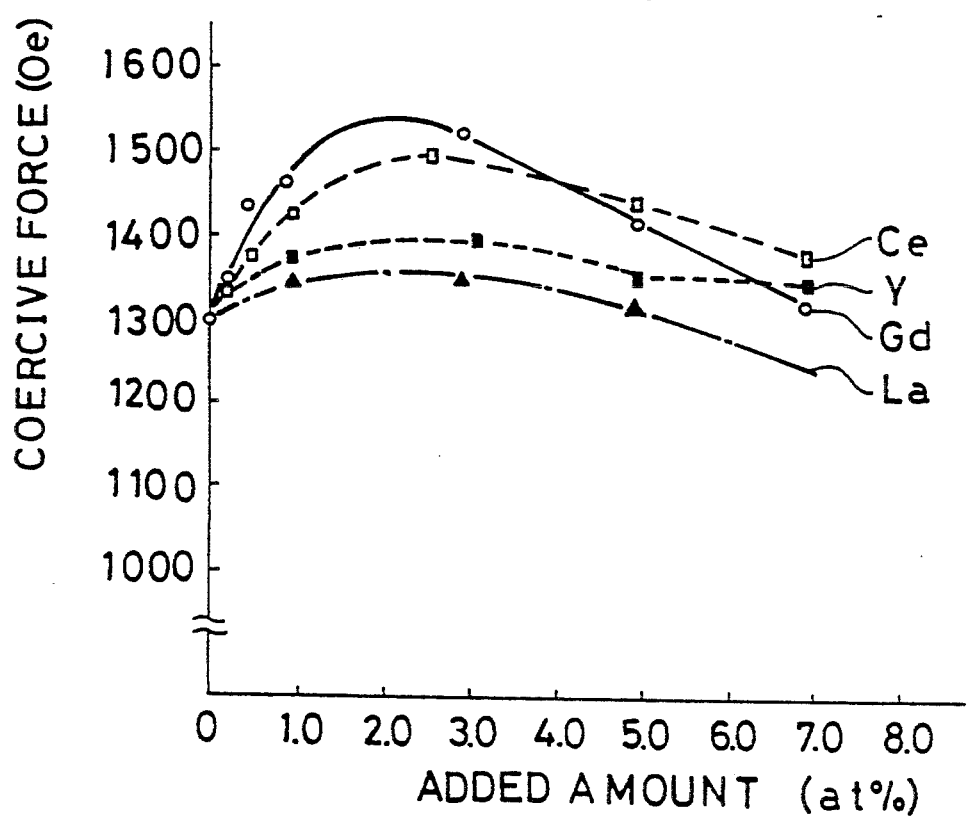
FIGS. 1, 2 and 3 show the relationship between the coercive force of the magnetic recording member and the amount of the additional element added to the Cr base layer for the magnetic recording members described in the Examples.

In the generation of coercive force in a magnetic recording medium, the Cr film forming the base layer plays an important role with respect to the following two points: (1) for controlling the crystallization orientation in the Co alloy film formed on the Cr film; and (2) for causing the Co alloy film so formed to have a film structure comprised of an aggregate of grains or particles.

Taking note of the above two functions of the Cr film forming the base layer, especially of the latter of the two, the inventors of the present invention have made various experiments in an effort to make the crystal grains of the Cr base film more refined or finer, and have discovered that when an element which is incapable of forming a solid solution with Cr, or does not form such a solid solution easily, is mixed with Cr, the crystal grains of the Cr film so formed become finer in size and exhibit more clearly a columnar, granular structure, therefore resulting in a higher coercive force.

The magnetic recording member of the present invention has been developed on the basis of the foregoing findings. It is an in-plane recording type magnetic recording member comprising a Cr base film formed a non-magnetic substrate, and a Co alloy film which is formed on the Cr base film without interruption of the operation of the film forming apparatus. This recording member is characterized in that the Cr base film contains at least one additional element selected from rare earth elements, Si, Cu, P, and Ge.

The additional element to be added to Cr in the Cr base film according to the present invention can be Y (yttrium), La (lanthanum), Ce (cerium), Pr (praseodymium), Nd (neodymium), Pm (prometium), Sm (samarium), Eu (europium), Gd (gadolinium), Tb (terbium), Dy (dysprosium), Ho (holmium), Er (erbium), Tm (thulium), Yb (ytterbium), or Lu (lutetium), all of which are rare earth elements, or Si (silicon), Cu (copper), P (phosphorus) or Ge (germanium). As an additive to Cr, any one of the foregoing elements may be used independently, or any two or more of them may be used together.

The amount of the additional element to be added to Cr is determined as appropriate according to the nature of the additional element, so that control of the crystallization orientation in the Co alloy film formed on the Cr base film may not be impaired and the crystallization property of the Cr base film is not adversely affected.

When at least one element selected from rare earth elements, Si, Cu, P and Ge is added to the Cr base film, said element (which hardly forms a solid solution with Cr) remains segregated at the grain boundaries of the Cr crystal grains, with the result that the Cr crystal grains are prevented from becoming larger and that isolation of the grains from one another is enhanced.

The present invention is illustrated in the following examples, to which the scope of the invention is not in any way limited.

EXAMPLE 1

In this example, each of Ce, Y, Gd and La was used independently as an additional element added to the Cr base film. Formation of a Cr base film on a non-magnetic substrate and then formation of a Co alloy film on the Cr base film by continuous operation were carried out in the following manner.

First, a non-magnetic substrate made of an aluminum plate plated with Ni-P by electroless plating was placed in a batch operation type sputtering apparatus equipped with three direct current magnetron cathodes, each measuring 7 inches in diameter. Then the treatment chamber in the sputtering apparatus was evacuated to $1 \times 10^{-6}$ Torr or below by means of a vacuum pump, and thereafter argon gas was introduced into the treatment chamber so that the pressure in the chamber is $2 \times 10^{-3}$ Torr.

Next, the substrate was kept heated at a temperature of 200° C. and, while a negative bias voltage of −300 V was applied to the substrate, a Cr base film having a thickness of 500 Å and having the above described composition was formed on the substrate by means of a direct current magnetron sputtering method. A pellet of the additional material was placed on the Cr target in the sputtering apparatus, in order to deposit a Cr base film containing the additional element. When the formation of the Cr base film was completed, a Co alloy film was formed immediately on the Cr base film, without interruption of the operation of the sputtering apparatus and while the bias voltage continues to be applied. The Co alloy film containing 20 atom % of Ni and 10 atom % of Cr and having a thickness of 500 Å was formed by placing Ni and Cr pellets on a GT ("gap target")-type Co target. It is important that the Co alloy film be formed in the above described continuous operation in order to avoid contamination of the surface of the newly formed Cr base layer by oxygen or other contaminants.

A protective carbon film having a thickness of 300 Å was further formed on the Co alloy film to complete the manufacture of the magnetic recording member according to the invention, the carbon film being formed without the application of a bias voltage to the substrate.

Magnetic recording members wherein the Cr base film contains the additional element shown in the following Table 1 were prepared by the above described method. The amount of additional element added to the Cr base film was adjusted by changing the surface area of the pellet of the additional element which is placed on the Cr target in the sputtering apparatus.

The coercive force (Oe) of each of the obtained magnetic recording members, and the amounts of each additional element in the Cr base film were measured.

The analysis of the additional element in the Cr base alloy was done by Auger analysis, and the coercive force was measured with a vibrating fluxmeter (VSM). The results are shown in Table 1 and FIG. 1. The coercive force (1300 Oe) of a magnetic recording member prepared in the same manner as described above, but containing no additional element in the Cr base layer is also shown in FIG. 1.

TABLE 1

| Ce | | Y | | Gd | | La | |
| --- | --- | --- | --- | --- | --- | --- | --- |
| Added Amount (at %) | Coercive Force (Oe) | Added Amount (at %) | Coercive Force (Oe) | Added Amount (at %) | Coercive Force (Oe) | Added Amount (at %) | Coercive Force (Oe) |
| 0.2 | 1320 | 1.0 | 1380 | 0.2 | 1340 | 1.0 | 1350 |
| 0.5 | 1380 | 3.0 | 1400 | 0.4 | 1440 | 2.8 | 1360 |
| 1.0 | 1430 | 5.0 | 1360 | 0.9 | 1470 | 4.9 | 1320 |
| 2.5 | 1500 | 7.0 | 1350 | 2.8 | 1520 | | |
| 5.0 | 1440 | | | 5.0 | 1420 | | |
| 7.0 | 1380 | | | 7.0 | 1330 | | |

EXAMPLE 2

Figure 2:
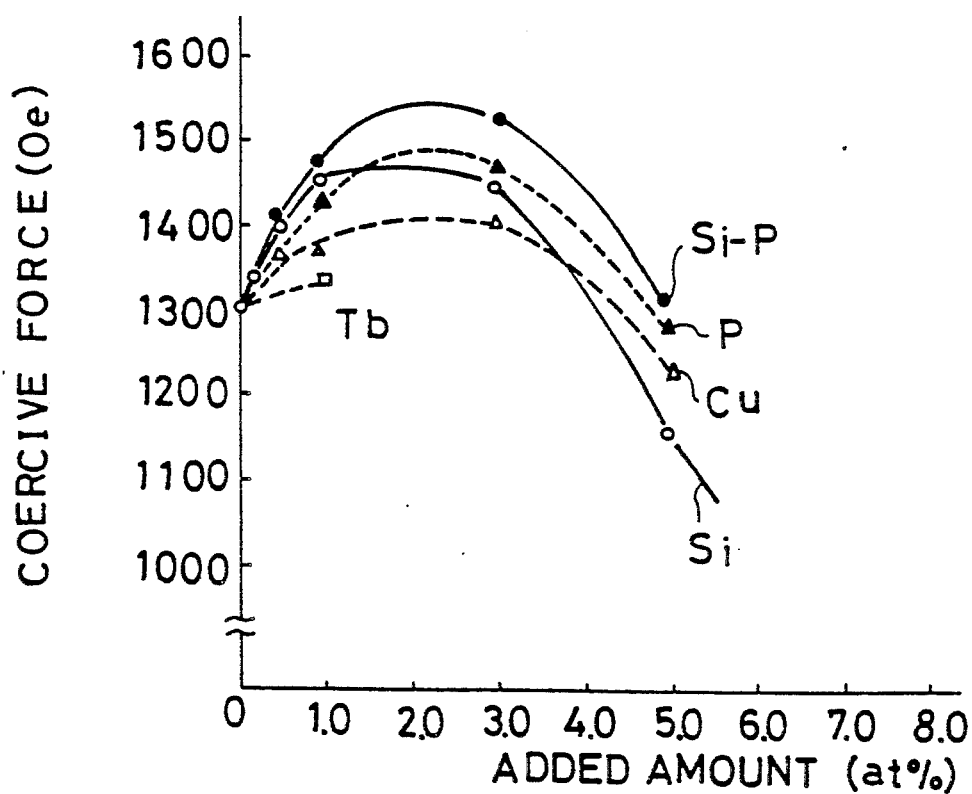

Magnetic recording members were manufactured in the same manner as described in Example 1, except that the additional element added to the Cr base film was P, Cu, Si, or Tb, or a 1:1 mixture of Si-p, as shown in Table 2. The coercive force of each of the magnetic recording members so obtained was measured in the same manner as in Example 1. The results are shown in Table 2 and FIG. 2. The coercive force (1300 Oe) of a magnetic recording member wherein the Cr base film does not contain an additional element is also shown in FIG. 2.

TABLE 2

| P | | Cu | | Si | | Tb | | Si—P | |
| --- | --- | --- | --- | --- | --- | --- | --- | --- | --- |
| Added Amount (at %) | Coercive Force (Oe) | Added Amount (at %) | Coercive Force (Oe) | Added Amount (at %) | Coercive Force (Oe) | Added Amount (at %) | Coercive Force (Oe) | Added Amount (at %) | Coercive Force (Oe) |
| 1.0 | 1420 | 0.5 | 1360 | 0.2 | 1330 | 1.0 | 1340 | 0.4 | 1410 |
| 3.0 | 1470 | 0.9 | 1370 | 0.5 | 1400 | | | 0.9 | 1480 |
| 5.0 | 1280 | 3.0 | 1400 | 0.9 | 1460 | | | 3.0 | 1530 |
| | | 5.0 | 1230 | 3.0 | 1450 | | | 5.0 | 1320 |
| | | | | 5.0 | 1160 | | | | |

EXAMPLE 3

Magnetic recording members were manufactured in the same manner as described in Example 1, except that the additional element added to the Cr base film was Ge or a 1:1 Ge-Si mixture, in the amounts shown on Table 3. The coercive force of these magnetic recording members was measured in the same manner as described in Example 1. The results are shown in Table 3 and FIG. 3. The coercive force (1300 Oe) of a similar magnetic recording member containing no additional element in the Cr base layer is also shown in FIG. 3.

TABLE 3

| Ge | | Ge—Si | |
| --- | --- | --- | --- |
| Added Amount (at %) | Coercive Force (Oe) | Added Amount (at %) | Coercive Force (Oe) |
| 0.2 | 1370 | 0.2 | 1400 |
| 0.5 | 1440 | 0.5 | 1480 |
| 1.0 | 1490 | 1.0 | 1500 |
| 3.0 | 1480 | 3.0 | 1450 |
| 5.0 | 1310 | 5.0 | 1300 |

Figure 3:
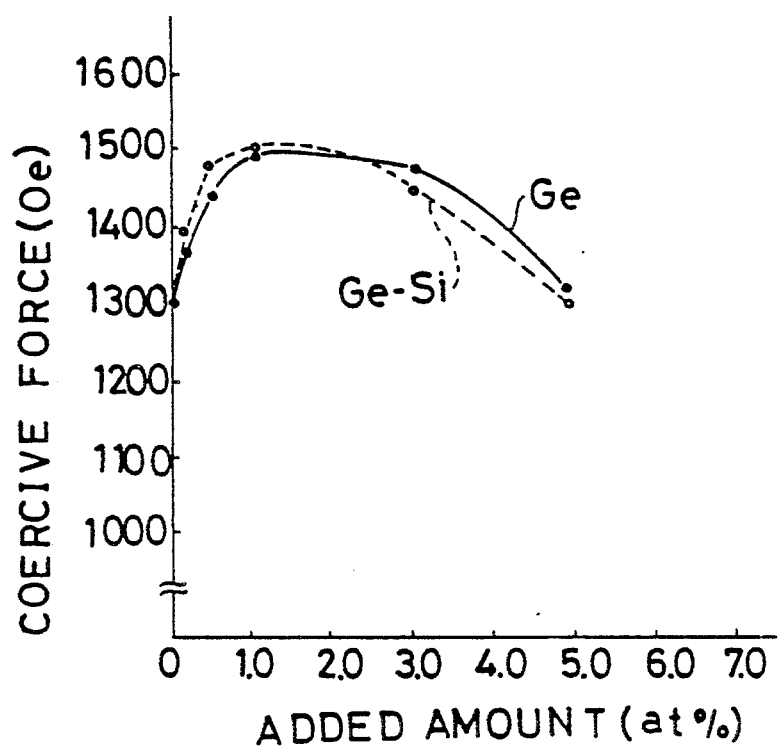

As shown in Table 1 and FIG. 1, Table 2 and FIG. 2, and Table 3 and FIG. 3, it has been confirmed that when at least one additional element selected from rare earth elements, Si, Cu, P, and Ge is added to the Cr base film formed on the substrate, the obtained magnetic recording member has an improved coercive force, as compared to a magnetic recording member in which the Cr base layer does not contain such an additional element.

A magnetic recording member comprising: (1) a Cr base film containing 1 atom % of Si and formed on a non-magnetic substrate, (2) the above described Co alloy film formed on the Cr base film, and (3) the above described protective C film provided on the Co alloy film was manufactured. A section of this magnetic recording member was microscopically observed by means of a scanning electron microscope (SEM). As a result, it was confirmed that, as compared with a similar magnetic recording member wherein the Cr base film contains Cr only, the magnetic recording member manufactured as above according to this invention has a more distinct columnar grain structure in which the grains are also finer.

In the foregoing experimental examples, a pellet of the additional element was placed on the Cr target for adding said additional element to the layer of the Cr base film formed on the non-magnetic substrate. However, the inventors have also confirmed that the same effect or result can be obtained when an alloy formed of Cr and at least one of said additional elements (added thereto in advance) is used as a target.

EXAMPLE 4

Of the magnetic recording members manufactured in the foregoing Examples 1 and 2, those containing Si, Ce, Cu, Gd, or P or the 1:1 Si-P mixture were formed into discs. These discs were measured individually for their S/N ratio when recording and playback at 5 $MH_z$ were made thereon. The results are shown in FIG. 4.

EXAMPLE 5

Discs made of the magnetic recording members prepared in the foregoing Example 3 were measured individually for their S/N ratio when recording and playback at 5 MHz were made thereon. The results are shown in FIG. 5.

Figure 5:
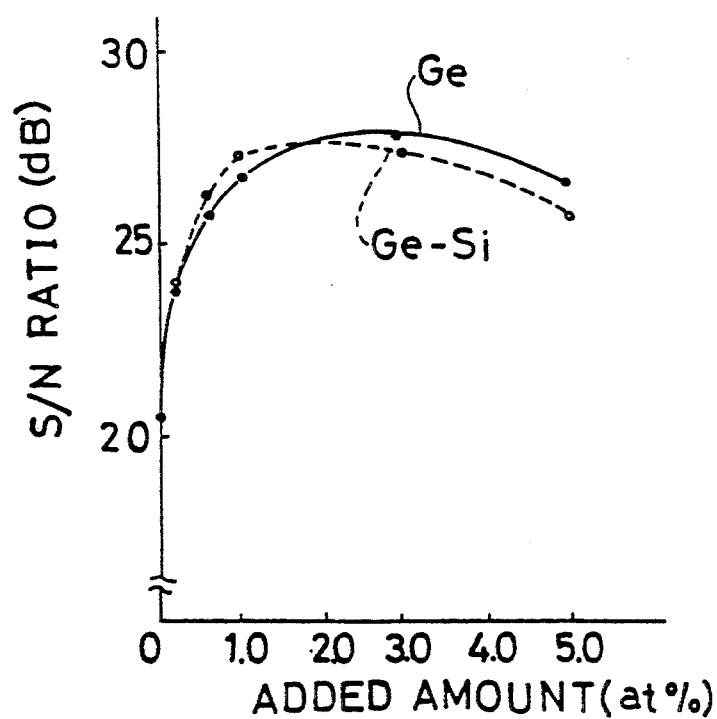
FIGS. 4 and 5 show the relationship between the S/N ratio measured during recording and playback on a disc made of the magnetic recording member of the present invention and the amount of the additional element added to the Cr-base layer.
Figure 4:
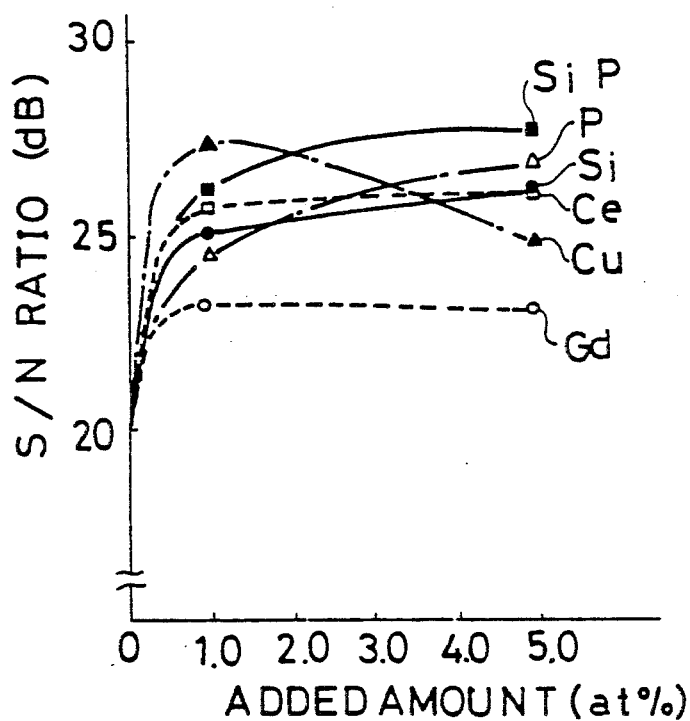

As is apparent from FIGS. 4 and 5, the S/N ratio was improved by 3 to 6 dB in magnetic recording members having an additional element added to the Cr base film, as compared with one in which the Cr base layer contains no such additional element. This improvement in the S/N ratio characteristic is attributable to the improved coercive force of the recording member.

COMPARATIVE EXAMPLE

Magnetic recording members were manufactured in the same manner as described in Example 1, except that W, V, Mo or Ti was used in place of the additional elements added to the Cr base film in Example 1, and the amount of W, V, Mo or Ti added to Cr was 1 atom %. The coercive force of each magnetic recording member so obtained was measured in the same manner as in Example 1. The results are shown in FIG. 6.

Figure 6:
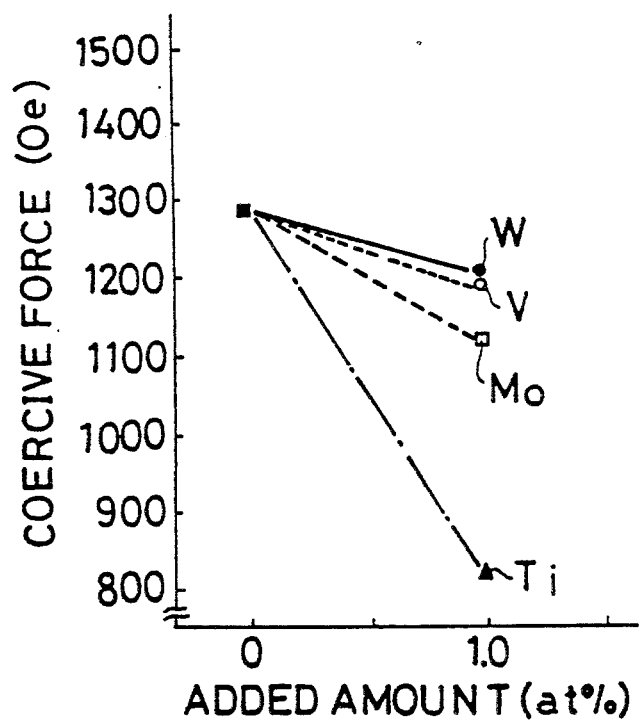
FIG. 6 shows the relationship between the coercive force of the magnetic recording member and the amount of the additional element added to the Cr base layer for the Comparative Example.

As is clear from FIG. 6, when the additional element added to the Cr base film is other than an element selected from among rare earth elements, Cu, Si, P and Ge, the coercive force of the magnetic recording member obtained is lowered rather than enhanced, as compared to a magnetic recording member in which the Cr base layer contains no additional element.

As described above, in a magnetic recording member obtained by adding to the Cr base film formed on a non-magnetic substrate at least one element selected from among rare earth elements, Si, Cu, P and Ge, the Cr base film so formed on the non-magnetic substrate is more distinctly of columnar grain structure and the intergranular isolation effect therein is greater, consequently promoting the intergranular isolation in the Co alloy film formed on the Cr base film. As a result, the coercive force of the magnetic recording member is improved over the coercive force of a magnetic recording member having a Cr-only base film which does not contain such an additional element.

We claim:
1. A magnetic recording member for longitudinal recording comprising:
   (a) a non-magnetic hard disc substrate;
   (b) a Cr base film formed on said substrate by a film forming process; and
   (c) a Co alloy film formed on said Cr base film by the same film forming process as in (b),
   wherein said Cr base film contains in addition to Cr at least one additional element selected from the group consisting of rare earth elements, Si, Cu, P and Ge, the amount of said additional element in said Cr base film being in the range from 0.2 atom % to 7.0 atom %, and wherein said Co alloy film is formed by continuous operation of said film forming process without interruption after completion of the formation of said Cr base film.

* * * * *